Dec. 22, 1953
R. WHITAKER ET AL
2,663,642
PROCESS OF CONCENTRATING MILK AND PRODUCT
Filed June 26, 1951
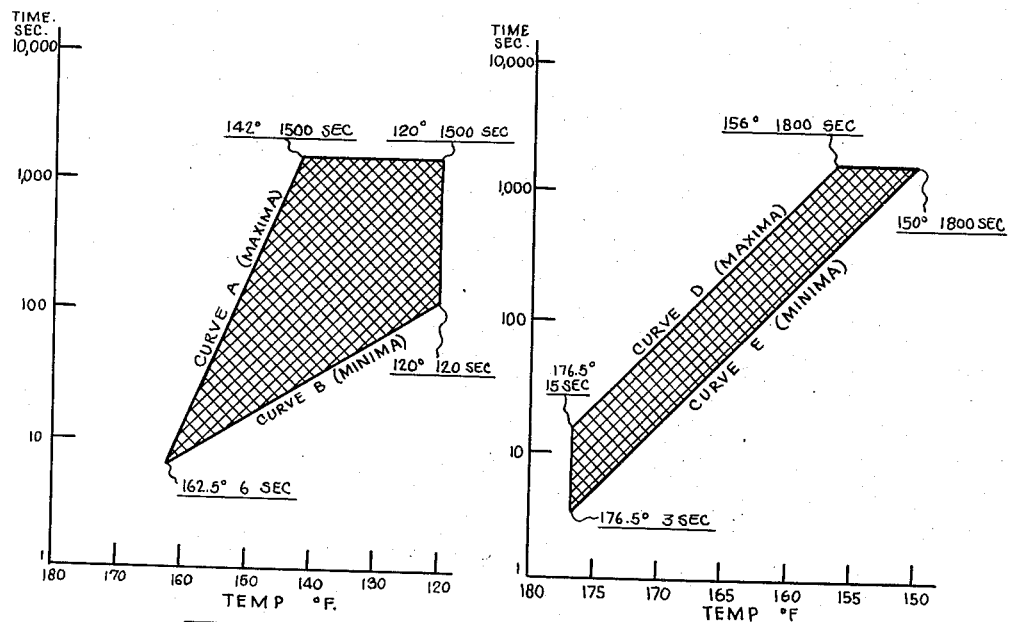
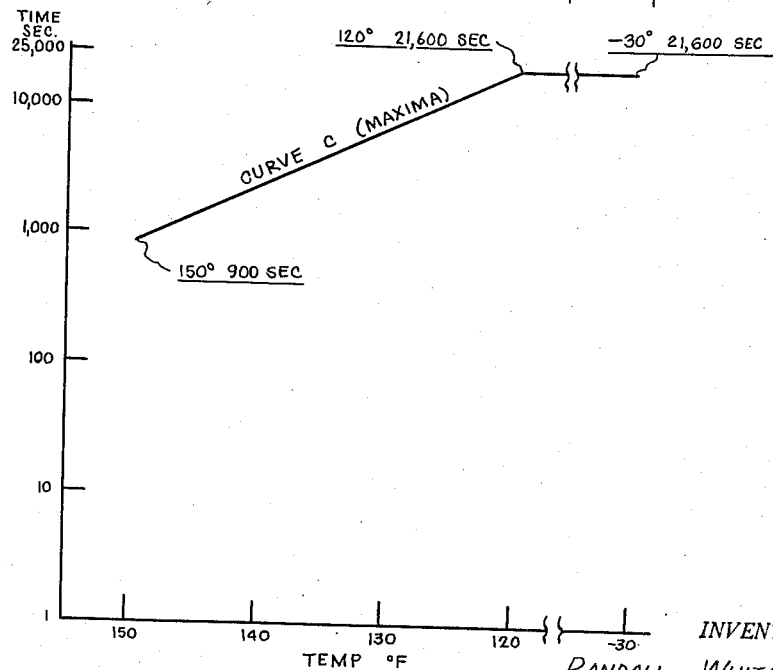
INVENTORS
RANDALL WHITAKER &
ALEXANDER C. HERRO
BY
Campbell, Brumbaugh, Free & Graves
ATTORNEYS Patented Dec. 22, 1953

2,663,642

UNITED STATES PATENT OFFICE 2,663,642

PROCESS OF CONCENTRATING MILK AND PRODUCT

Randall Whitaker, Sayville, and Alexander C. Herro, Oakdale, N. Y., assignors to National Dairy Research Laboratories, Inc., Islip, N. Y., a corporation of Delaware Application June 26, 1951, Serial No. 233,566

22 Claims. (Cl. 99—55)

This invention relates to a process of concentrating fluid milk and to a fluid concentrated milk which is reconstitutable with water to its original volume to produce a fluid milk fully comparable and in most instances substantially indistinguishable in flavor from fresh milk.

There exists a large market for concenttared fluid milk products, as is evidenced by the large sales of sterilized evaporated milk. However, it is generally conceded that although evaporated milk is reconstitutable with water to produce a a fluid milk, milk, the reconstituted product, differs pronouncedly in flavor from fresh milk, described as having a "cooked" or "boiled" flavor.

This flavor undoubtedly is due to the processing conditions. In the production of sterilized evaporated milk, it is essential to preheat the milk to at least 180° F. in order to prevent the formation of grain during sterilization. Therefore, sterilized evaporated milk is usually prepared first by preheating the fresh milk to 180° F. or higher, holding at this temperature for from 10 to 30 minutes, concentrating at temperatures ranging from 110 to 180° F., but usually in the range from 120 to 135° F., standardizing by the addition of water, filling into cans, preheating from 200 to 210° F. and finally sterilizing at from 240 to 250° F.

Many processes have been proposed for concentrating fluid milk to produce a concentrated milk for distribution to consumers and home consumption, but these processes have not been successful commercially, primarily because at some stage of the process a "cooked" flavor appears. Even though the milk may be successfully concentrated without developing a "cooked" flavor, when the concentrated milk is pasteurized, a "cooked" flavor almost invariably results.

To avoid this difficulty, it has been proposed that the milk be pasteurized before concentrating. However, most localities require pasteurization just before bottling so that this expedient has a limited application. Moreover, when a pasteurized milk is concentrated, "cooked" flavor frequently arises during concentration.

Thus, so faithfully has an "off" flavor dogged the footsteps of the workers in this field that it has been regarded as inevitable. A truly satisfactory commercial process for concentrating and pasteurizing fluid milk without development of an "off" flavor has not been forthcoming.

Accordingly, it is an object of the present invention to provide a process applicable on a commercial scale for concentrating fluid milk and pasteurizing the concentrate to form a product which, when reconstituted to its original volume by addition of water, possesses a flavor fully comparable to, and in most instances, substantially the same as, the pasteurized original fresh milk.

It is a further object to provide a pasteurized concentrated milk which possesses no "off" flavor, such as a "cooked" flavor, which can be stored for long periods of time, and which, despite a lower butter fat and calorie content than regular cream, frequently can be used as a substitute for cream.

It is a further object of the invention to provide a pasteurized concentrated fluid milk which can be reconstituted with water to produce a fluid milk having a better flavor than pasteurized homogenized whole milk from the same raw milk supply.

It is also an object of the invention to provide a concentrated milk which, on reconstitution with water, will produce a fluid milk in which the butter fat and the solids-not-fat contents will be in optimum relationship to each other from the standpoint of flavor.

The process contemplated by the invention includes preheating and concentrating the milk and, in one featured embodiment, pasteurizing the concentrated milk. In another embodiment, the milk may be homogenized after concentration and following or preceding pasteurization.

In this process, the above objects are accomplished by controlling within specified limits the temperature of the milk at each stage of the process and the time during which it is held at any temperature. As will be seen, these limits vary according to the stage of the process under consideration and to some extent depend upon what is to be accomplished, for certain operations require higher temperatures than others. Furthermore, use of a high temperature in one stage may necessitate the use of a lower temperature in another stage in order to hold at a minimum the time during which milk is held at elevated temperatures. The maximum temperature at which the milk can be maintained in the process of the invention is about 176.5° F., and this temperature is permissible in the pasteurizing stage only; the milk is not held at this temperature for more than 15 seconds. Preferably, the milk is never heated to a temperature above about 165° F. at any stage of the process, and it is always desirable to use the lowest temperatures and shortest times commensurate with the result desired and the available equipment.

The invention thus has as its basis an appreciation of the closely controlled conditions under which water must be removed in concentrating milk, as well as in the procedural steps related to concentration, including preheating the milk prior to concentration and pasteurizing the concentrated milk, if the milk is to be concentrated to a fraction of its original volume without injuring the delicate food substances therein and thus retain the flavor and nutrition values of fresh whole milk. Especially noteworthy is an appreciation of the intimate relationship between the temperature and the time during which that temperature is applied. The limits of time and temperature must be rigorously observed and indeed are very critical if the development of an "off" flavor, such as "cooked" or "boiled" flavor, is to be avoided.

The time during which the milk is held at any temperature is inversely related to the temperature. The relationship between time and temperature for each of three stages of the process of the invention is shown in the drawings, in which:

Fig. 1 is a graph of the relationship between time and temperature in the preheating of the milk prior to concentrating, maxima and minima curves A and B, respectively, enclosing a shaded area I which represents the operative process conditions which must be observed in this stage;

Fig. 2 is a graph of the relationship between time and temperature in the concentration of the milk, curve C marking the maximum limits of time and temperature which must be observed in this step, any conditions in the area below curve C representing the operative process conditions; and Fig. 3 is a graph of the relationship between time and temperature in the pasteurization of the concentrated milk, maxima and minima curves D and E respectively enclosing a shaded area III which represents operative process conditions which must be observed in this step.

The process may be carried out employing usual dairy equipment, including a stainless steel vacuum pan and drop tank for the concentration operation. The milk should not be permitted to contact copper or copper alloys at any stage of the process. All equipment used should preferably be of stainless steel, and stainless steel was used in the examples set forth later herein.

The invention is particularly applicable to cows' milk. However, the term "milk" as commonly used refers to the natural secretion of the mammary glands of a mammal, and the process may be employed to concentrate any milk, including, in addition to cows' milk, mares' milk, goats' milk, ewes' milk, etc. Whole milk, cream and skim milk can be concentrated successfully by the process, and unless otherwise indicated, are included in the term "milk" as used herein. Those skilled in the art are aware that cream of the higher butter fat contents is difficult to concentrate without breaking the emulsion, and will appreciate that greater precautions must be taken in such cases. It will be understood that only raw milk is concentrated in accordance with the invention, pasteurization being carried out on the concentrate; it is, however, preferred to employ a raw milk having a low bacterial count.

In accordance with the invention, concentrated milk may be made from any combination or mixture of milks as starting materials, but usually it is made either from (1) whole fluid milk or (2) cream, or (3) by separating whole fluid milk into cream and skim milk, concentrating the skim milk or the cream or both and then recombining them.

Several variations may be introduced in processing each of these three basic starting materials. For example, in the case of (1) and (2) the ratio of the butter fat to milk solids-not-fat may be adjusted before or after concentration by the addition or removal of butter fat in the form of cream, or by addition or removal of milk solids-not-fat in the form of fluid or concentrated skim milk. In the case of (3), variations include the separate preheating treatment of a high fat and a low fat milk followed by combining the two, separate concentration of a high fat and a low fat milk followed by combining the two, or concentration of either the high fat or the low fat milks, followed by combining the two.

Before considering details of the essential process operations of the invention, it should be stated that there are two general methods of applying the process of the invention: the batch method and the continuous method.

In the batch method, the milk is drawn into the vessel in which it is to be preheated, concentrated or pasteurized, and the operation begun. If the operation involves concentrating the milk, as the volume of milk decreases, it is the custom to introduce more unconcentrated milk into the vessel. The operation is continued until the contents of the vessel have reached the desired temperature, concentration or have been pasteurized, as the case may be, at which time the application of heat is discontinued, and the treated product withdrawn.

In a batch system, it is apparent that in the preheating and pasteurizing operations the temperature and time of treatment are ascertainable within the precise limits, and can be carefully controlled. In the concentrating operation, however, all of the milk in the vessel has not been subjected to the treatment for the same length of time, that which was drawn into the vessel last being under treatment for the shortest period of time. It has been found that a satisfactory concentrate, free from "cooked" flavors, is obtainable when the temperatures indicated by curve C of Fig. 2 are not exceeded but the treatment times indicated by the curve are computed as the average time during which the milk in the vessel is held at the indicated temperature.

In a continuous operation, milk is drawn into the vessel in which it is to be preheated, concentrated or pasteurized and the operation begun. Untreated milk is continuously admitted into the vessel during operation and when the milk in the vessel has reached the desired temperature or concentration, or is pasteurized, removal of milk is begun. Thereafter, the rate of flow of untreated milk, admitted to the vessel is kept equal, or at least approximately equal, on a solids basis to the rate of withdrawal of milk from the vessel.

In this case, all of the milk in the vessel has not been subjected to the treatment for the same length of time, and some of the milk may remain in the vessel for quite long periods. It has been found that a satisfactory concentrate free from "cooked" flavor is obtained when the maximum temperatures indicated by the curves A, C and D of Figs. 1, 2 and 3 respectively are never exceeded, but the times indicated by the curves are computed as the average time that the milk is subjected to the treatment in question.

The process operations of the invention will now be considered in greater detail. It will be understood that the treatment times referred to in the following discussion are to be regarded as average times, when applied to batch concentration or continuous preheating, concentration or pasteurization of milk. At the start of any of the operations to be considered the milk is brought to an operating temperature as quickly as possible and in any event within about twenty minutes if the operating temperature is about 140° F. or below, and within about ten seconds if the operating temperature is 160° to 176° F. with proportionate times at intermediate temperatures. At the conclusion of the operation the milk is cooled to a storage temperature, or is brought to the next operating temperature, if a change in temperature is required, as quickly as possible, and in any event within about twenty minutes if the operating temperature is about 140° F. or below and within about ten seconds if the operating temperature is 160° to 176° F. with proportionate times at intermediate temperatures. This is in accord with the general theory of the invention that the total treatment time of the milk beyond that specified in the preheating, concentrating and pasteurizing operation of the invention, should be kept at a minimum, and is taken into account in the operating conditions established in the process of the invention.

The preheating treatment

Prior to concentration, the milk is preheated at a temperature and for a time sufficient to reduce the activity of the lipase and also preferably to reduce the bacterial count sufficiently to prevent spoilage and/or development of rancidity at a later process stage. This preheating is essential because later steps are conducted at temperatures and under conditions which may favor bacterial growth and lipase-induced rancidity. The temperature and time required to accomplish this will, of course, depend upon the bacterial count and lipase concentration of the milk, and this will vary considerably even from batch to batch taken from the same milk supply. However, in all cases the time and temperature are chosen within the shaded area I of Fig. 1.

The minimum heat treatment is indicated in Fig. 1 by curve B which runs along a logarithmic line from 6 seconds at 162.5° F. to 120 seconds (2 minutes) at 120° F. The minimum treatment will sufficiently retard the activity of lipase to prevent the development of rancidity during later stages of the process, but may have little effect on the bacterial count. The maximum heat treatment will also materially reduce the bacterial count, and is represented by curve A which runs along a logarithmic line from 6 seconds at 162.5° F. to 1500 seconds (25 minutes) at 142° F.

The maximum preheating temperatures and heating times indicated by curve A in Fig. 1 must be closely observed to prevent development of "cooked" flavors,

The concentrating of the preheated milk

The maximum times and temperatures permitted during the concentrating operation if development of "cooked" flavors are to be avoided are shown by curve C of Fig. 2. Any conditions represented in the area below curve C are operative. The curve extends logarithmically from 900 seconds at 150° F. to 21,600 seconds (6 hours) at 120° F. No minimum temperatures are specified, but even when temperatures below 120° F. are employed, the time should never exceed 6 hours.

Because milk cannot readily be concentrated under atmospheric pressure at the maximum temperatures imposed in order to prevent the development of a "cooked" flavor, it is usually found convenient to concentrate the preheated milk under reduced pressure. The pressure used, as those skilled in the art are aware, controls the boiling point; lowering the pressure lowers the boiling point of milk, and hence lowers the concentrating temperature. A pressure not higher than 2 to 4 p. s. i. absolute is usually satisfactory, but very low pressures can be used for concentrating at lower temperatures, for example, for concentrating in the frozen state.

While low temperatures, i. e. 40 to 110° F., may be employed, unless the bacterial count is negligible following preheating it is usually desirable to concentrate at a temperature which discourages bacterial growth, i. e. about 120 to 140° F. This consideration is important in a commercial process, in view of the length of time required to concentrate large volumes of milk.

Concentration of the milk is continued to the desired solids content. However, as the solids content increases, protein coagulation may occur and care should be exercised to reduce the concentrating temperature to prevent excessive thickening of the product in the concentrating vessel. Milk concentrated to a 50% solids content is subject to protein coagulation at about 145° F., and milk of 60% solids content is subject to this condition at about 115° F. Although heating at temperatures which may induce protein coagulation may improve the keeping quality of the concentrate, and lead to an increase in viscosity, facilitating shipping, heat coagulation should not be permitted to occur until concentration is complete.

Selection of the solids content of the concentrate will be governed by several considerations. There are advantages in continuing the concentration of the milk to a solids content of from 40 to 62.5%, at least initially. The rate of bacterial growth is considerably below normal (for milk) in a concentrated milk of high solids content, i. e., from 40 to 62.5%, and therefore this product may be held for long periods of time under refrigeration, below 40° F., without pasteurization. In fact, during storage the bacterial count in many instances has been observed to go down rather than increase, as the following data show:

TABLE I

| No. | Standard plate count immediately after manufacture | Standard plate count 7 days after manufacture |
| --- | --- | --- |
| 1 | 20,100 | 9,380 |
| 2 | 23,600 | 1,400 |
| 3 | 17,800 | 11,900 |

Such a highly concentrated product can be shipped at a considerable saving in freight and later be combined with water, milk or cream to form a concentrated milk of lower total solids content which may then be homogenized, pasteurized and cooled.

The milk concentrate can be heated at 115 to 145° F., depending on its solids content, to increase its viscosity, and then cooled. It may then be shipped in waterproof paper containers instead of metal containers.

Where the keeping qualities of a high solids product are not needed, a solids content in the range of 30 to 40% is preferred, inasmuch as the product at these concentrations has a workable viscosity, can be homogenized and yet has a minimum bulk volume, an important factor in packaging and marketing the product.

If the concentrate is to be homogenized, there must be taken into account the fact that a solids content of approximately 40% is the maximum that can be handled conveniently in most available homogenizers. However, the product may be brought to a higher solids content, say 62.5%, to take advantage of benefits afforded by that solids content, and then before use diluted back with water or milk to a solids content at which it can be homogenized.

When the solids-not-fat content exceeds about 35%, lactose may crystallize. The crystallization of lactose imparts a sandy or gritty texture to the concentrate. Although this lactose will redissolve when the milk is reconstituted, inasmuch as some consumers may wish to use the concentrate on cereal or on fruit, for example, it may be desirable that the concentrate be free from lactose crystals. In this event, it is usually preferable to standardize the concentrate to approximately 35% total solids at least before it is sold. From this standpoint, a very satisfactory commercial product is a three-to-one concentrate containing about 34% to 36% total solids, of which 10 to 11% is butter fat and 24 to 26% is milk solids-not-fat.

The concentrate from the standpoint of a completed product is marketable as such, but in most instances, and particularly where it is to be made available on a commercial scale, it will be desirable to pasteurize it.

The pasteurizing of the concentrate

The milk may be pasteurized directly after concentration. Where the milk is homogenized it may be pasteurized either before or after homogenization, although in the usual case, because of possibilities of contamination and increase in bacterial count during homogenization, it will be found preferable to pasteurize following homogenization. For convenience of discussion, however, the pasteurization operation will now be considered and the discussion of homogenization will be deferred.

The shaded area of Fig. 3 shows the operative pasteurizing conditions. The maximum times and temperatures permissible for pasteurization if development of "cooked" flavors is to be prevented are shown in Fig. 3 by curve D, which extends logarithmically from 15 seconds at 176.5° F. to 1800 seconds (30 minutes) at 156° F. The minimum times and temperatures for adequate pasteurization are shown in Fig. 3 by curve E, which extends logarithmically from 3 seconds at 176.5° F. to 1800 seconds (30 minutes) at 150° F.

It will be noted that pasteurization of the concentrate is carried out at a temperature approximately 5 to 15° higher for a given holding time than is normally employed, i. e., 150° to 156° F. for 30 minutes instead of the normal 143 to 145° F. for 30 minutes. This is because the concentrated milk, having a higher viscosity than unconcentrated milk, requires more heat to effect the desired percentage reduction in bacterial content. Also, higher pasteurization temperatures have been found to improve the keeping quality of the finished product.

The pasteurized concentrated product can be marketed as such, and it can be reconstituted with varying volumes of water, milk or cream to produce a more dilute product serving different purposes.

The pasteurized concentrate has truly remarkable keeping qualities, provided it is stored at 40° F. or below but above the freezing point of the concentrate. Coagulation of protein may occur in the product, if frozen. A concentrate of 34% solids freezes at about 27° F.

Homogenizing the concentrate

The concentrated whole milk, concentrated cream, or a combination of the concentrated skim milk and concentrated or unconcentrated cream, can be homogenized at a temperature in the range from 120 to 165° F. and pressures in the range from 1500 to 5000 p. s. i. For a product having a solids content in the range of 30 to 40%, pressures from 1500 to 3500 p. s. i. are preferred. As has been stated, homogenization can be carried out before or after pasteurization.

The butter fat globules in cream homogenized at 120 to 165° F. and pressures between 3000 and 5000 p. s. i. become "clumped." This condition is evidenced by an appreciable increase in viscosity. Cream treated in this manner can be mixed with concentrated skim milk to form a product which, on reconstitution, has an enhanced flavor acceptability. However, the mixture of clumped cream and skim milk can be homogenized, thus breaking up the clumps of fat globules in the cream and redispersing them throughout the body of the mixture. A product made in this manner may have, on reconstitution, a somewhat lower flavor acceptability than that reconstituted from a product made by mixing clumped cream and skim milk without subsequent homogenization of the mixture. Nevertheless the product made by mixing and homogenizing clumped cream and concentrated skim milk will have a flavor acceptability equal to or greater than that of the product made by mixing unhomogenized cream with concentrated skim milk and thereafter homogenizing the mixture.

During homogenization the butter fat is evenly distributed and the product is made uniform in this respect. A homogenized concentrate may be reconstituted to give a fluid milk having a low curd tension which is of the same order as homogenized whole milk.

The concentrated milk of the invention

It will be appreciated that concentrated milks containing a variety of butter fat and solids-not-fat contents can be prepared, depending upon which of the following are used as starting materials, and the proportion of each constituent: whole milk or a mixture of whole milk and cream; whole milk and skim milk; cream and skim milk; cream and concentrated skim milk; whole milk and concentrated skim milk; and concentrated cream and concentrated skim milk.

From the standpoint of flavor acceptability there is an optimum solids-not-fat content for any given butter fat content. This relationship is shown in the following table:

TABLE II.—OPTIMUM RATIOS OF BUTTER FAT AND SOLIDS-NOT-FAT

| Total in reconstituted milk | | Approximate ratios in reconstituted or concentrated milk | |
|---|---|---|---|
| Butter fat | Solids-not-fat | Butter fat | Solids-not-fat |
| Percent | Percent | | |
| 2.5 | 10.2–10.7 | 1:4.1 | 1:4.3 |
| 3.0 | 10.0–10.5 | 1:3.3 | 1:3.5 |
| 3.5 | 9.7–10.2 | 1:2.8 | 1:2.9 |
| 4.0 | 9.5–10.0 | 1:2.4 | 1:2.5 |
| 4.5 | 9.2– 9.7 | 1:2.0 | 1:2.2 |

The table shows that for milk containing 2.5% butter fat, the most acceptable flavor is obtained when the solids-not-fat content is in the range between 10.2 and 10.7% whereas if the butter fat content is 4.5%, the most acceptable flavor is obtained when the solids-not-fat content is 9.2 to 9.7%.

The ratio of butter fat and solids-not-fat of any concentrated milk of the invention can be brought within the ranges set forth in Table II by addition of cream or skim milk to the concentrated milk, or the ratio may be adjusted prior to concentration. Cream is added to increase the relative butter fat content, and skim milk to increase the relative solids-not-fat content of the reconstituted product, to meet the ratio requirements.

Taste comparisons have shown that milks reconstituted from a concentrated milk with water in accordance with the invention and falling within the range of compositions covered by Table II are all equally acceptable. In all taste comparisons made until now between a concentrated milk diluted to an optimum composition within the proportions of the above table and freshly homogenized pasteurized milk, the milks were either equally acceptable in flavor or the reconstituted milk was preferred. In no case has the fresh milk been preferred over the reconstituted concentrated product. Table III shows results of taste tests which are typical:

A preferred concentrated product in accordance with the invention is prepared from whole raw milk by preheating at 145° F. for 15 minutes, concentrating at 125° F. to a solids content somewhat above 34.15%, homogenizing at 125° F. and a pressure of 2500 p. s. i., and pasteurizing at 155° F. for 30 minutes. The concentrated product is brought to a solids content of 34.15% by dilution with water, preferably before pasteurization, and contains 9.9% butter fat and 24.25% solids-non fat. When reconstituted with twice its volume of water, it yields a milk containing 3.5% butter fat and 8.58% solids-not-fat. The same concentrated milk reconstituted with 1.6 to 1.7 volumes of water yields a composition lying in the optimum range for flavor, as shown in Table II.

A concentrated milk which can be reconstituted with water to produce a product having a better flavor than the pasteurized and homogenized original whole milk can be prepared by separating milk into skim milk and cream of at least 20% fat content, condensing the skim milk separately at temperatures and pressures within the ranges set forth heretofore, homogenizing the cream at a temperature in the range from 120 to 165° F. under a pressure of 3000 to 5000 p. s. i., sufficient to cause a clumping of the butter fat globules in the cream, as evidenced by an appreciable increase in viscosity, recombining the unhomogenized concentrated skim milk with the homogenized cream and pasteurizing without further homogenization. Reconstituted milk prepared from this concentrated product has a better flavor than one prepared by concentrating and homogenizing whole milk under precisely the same conditions as the cream in the previous procedure and then pasteurizing. The reason for the difference in flavor is not yet fully understood. Preparation of a product of this type is illustrated in Example 10.

The following examples are illustrative of the process of the invention and of the various products which may be obtained thereby.

EXAMPLE 1

Whole raw milk is heated at 143° F. for 5 minutes in order to decrease the activity of the lipase. The preheated milk is then transferred to a vacuum chamber and concentrated at 127° F. under a pressure of 2 p. s. i. During concentration the milk is circulated through a heat exchanger whose heat exchange surfaces are kept at 165° F. After about 4 hours the solids content has reached about 40%, and the milk is removed from the vacuum chamber, diluted with water to 34.15% total solids and homogenized at 120° F. and at a pressure of 3500 p. s. i. It is then pasteurized at 156° F. for 30 minutes and cooled to below 40° F., but not below freezing temperature.

Analyses typical of the concentrate obtainable by this process appear in Table IV, which compares the composition of the concentrated and reconstituted milks with the whole milk from which they were prepared:

TABLE III

| Number of tasters | Correctly matched like samples | Matched unlike samples | Unable to match samples | Calculated deviation from equality, in standard errors | Probability of chance selection | Preferred sample A [1] | Preferred sample B [2] | No choice | Preferred sample | Degree of preference deviation from equality, in standard errors | Probability of chance occurrence of preference |
|---|---|---|---|---|---|---|---|---|---|---|---|
| | | | | | Percent | | | | | | Percent |
| 83 | 55 | 27 | 1 | 3.1 | 0.194 | 30 | 50 | 3 | B | 2.2 | 2.78 |
| 70 | 44 | 26 | 0 | 2.2 | 2.78 | 27 | 41 | 2 | B | 1.7 | 8.91 |
| 80 | 68 | 11 | 1 | 6.4 | 2×10⁻⁷ | 27 | 51 | 2 | B | 3.0 | 0.27 |
| 82 | 49 | 32 | 1 | 1.9 | 5.74 | 34 | 44 | 4 | B | 1.1 | 27.13 |
| 82 | 50 | 32 | 0 | 2.0 | 4.55 | 36 | 45 | 1 | B | 1.0 | 31.73 |

[1] Sample A in every case was regular pasteurized milk.
[2] Sample B in every case was pasteurized homogenized milk in which the ratio of butterfat to solids-not-fat had been adjusted to an optimum ratio for flavor, as indicated in Table II.

TABLE IV

| | Concentrated milk | | Concentrated milk, reconstituted with 2 vol. water | | Concentrated milk, reconstituted with 1 vol. water | | Pasteurized whole milk | |
|---|---|---|---|---|---|---|---|---|
| | Per quart (gm.) | Percent weight | Per quart (gm.) | Percent weight | Per quart (gm.) | Percent weight | Per quart (gm.) | Percent weight |
| Butter fat | 102.6 | 9.9 | 34.2 | 3.5 | 51.3 | 5.18 | 34.2 | 3.5 |
| Protein | 93.2 | 9.0 | 30.8 | 3.16 | 46.6 | 4.71 | 30.8 | 3.16 |
| Lactose | 138.0 | 13.3 | 46.0 | 4.72 | 68.8 | 6.95 | 46.0 | 4.72 |
| Ash | 20.2 | 1.95 | 6.7 | 0.7 | 10.1 | 1.02 | 6.7 | 0.7 |
| Total solids | 354.0 | 34.15 | 117.7 | 12.08 | 176.8 | 17.86 | 117.7 | 12.08 |
| Water | 682.0 | 65.85 | 858.3 | 87.92 | 813.2 | 82.14 | 858.3 | 87.92 |
| Total weight | 1,036.0 | | 976.0 | | 990.0 | | 976.0 | |

The concentrate (34.15% solids) has a slightly salty taste and is characterized by remarkable keeping qualities. It freezes at about 27° F. If it is stored in an ice box or mechanical refrigerator at a temperature above its freezing point but below 40° F., it will usually maintain its fresh flavor for about four weeks, but samples prepared in the manner outlined above have been known to remain sweet and fresh tasting for from six to eight weeks.

Plate counts made by standard bacterial methods on concentrated milk produced under commercial conditions in accordance with the specifications described herein usually show less than 1000 colonies per gram. Out of 12 consecutive lots commercially produced, only one showed 1200 per gram, the rest being 1000 or less. Pasteurized fluid milk usually contains from 1000 to 10000 colonies per gram.

The concentrate can be fortified with any nutritionally desirable amount of vitamin D. For example, 400 U. S. P. units of vitamin D can be added per reconstituted quart.

When reconstituted with two volumes of cold water, this product has the same characteristics as to body, homogeneity and flavor as regular pasteurized homogenized milk. The curd tension of the reconstituted concentrated milk is of the same order as that of regular pasteurized homogenized milk.

Table V below gives the results of taste tests which show reconstituted concentrated milk made according to the process described in this example to be indistinguishable from fresh pasteurized whole milk. These tests were conducted in the following manner: A sample of pasteurized, homogenized whole milk and a sample of reconstituted concentrated milk were presented to each taster. The samples were identified only by number. A third sample was presented to each taster, who was told that it was identical with one of the first two samples. Each taster was asked to indicate which of the first two samples the third matched. The results were evaluated statistically.

TABLE V

| Number of tasters | Number making correct selection | Number making wrong selection | Number who were unable to make a selection | Calculated deviation from equality in standard errors | Probability of chance occurrence of selections |
|---|---|---|---|---|---|
| | | | | | Percent |
| 81 | 43 | 38 | 0 | 0.5 | 50.00 |
| 70 | 38 | 32 | 0 | 0.7 | 48.39 |
| 68 | 33 | 34 | 1 | 0.1 | 50.00 |
| 75 | 42 | 33 | 0 | 1.0 | 31.73 |
| 83 | 44 | 39 | 0 | 0.5 | 50.00 |

The results of the table above show that the possibility of the selections having been made by chance is great, indicating that the panel of tasters was unable to distinguish between the two milks.

A number of taste tests were also run for the purpose of finding a preference, if any, between pasteurized, homogenized whole milk and milk reconstituted from concentrated milk prepared according to this invention. Table VI shows the results of some of the typical tests. In this test, tasters were given one sample of pasteurized, homogenized whole milk and one sample of reconstituted concentrated milk. Each was asked which sample he preferred.

TABLE VI

| Number of tasters | Number who preferred pasteurized homogenized whole milk | Number who preferred reconstituted concentrated milk | Number making no choice | Calculated deviation from equality in standard errors | Probability of chance occurrence of selections |
|---|---|---|---|---|---|
| | | | | | Percent |
| 81 | 36 | 43 | 2 | 0.8 | 42.37 |
| 68 | 36 | 29 | 3 | 0.8 | 42.37 |
| 91 | 46 | 42 | 3 | 0.4 | 50.00 |
| 83 | 37 | 41 | 6 | 0.4 | 50.00 |

The results show equal acceptability for the two milks.

EXAMPLE 2

Raw whole milk is separated into skim milk and cream containing approximately 40 to 50% butter fat. The skim milk is conducted through a heat exchanger where it is heated to just below 162.5° F. and held at that temperature for 6 seconds in order to reduce the lipase activity and bacterial count, after which it is immediately flashed into a vacuum chamber. The skim milk is circulated from the vacuum chamber through a heat exchanger supplied with hot water at 165° F., and then back into the vacuum chamber which is held at a temperature of 110° F. and a pressure of 1.25 p. s. i. absolute, until 77 to 81% of the water contained therein is removed. The product consequently will have a solids content of from 30% to 34%.

The cream is heated to 150° F. and held at that temperature for approximately 2 minutes in order to reduce its lipolytic activity, after which it is mixed with the concentrated skim milk.

Water or whole milk is added so that the final product will have about 10% butter fat and 34% total solids content after which the mixture is heated to approximately 140° F. and homogenized at a pressure of approximately 2000 p. s. i., pasteurized at 155° F. for 30 minutes and cooled to 40° F.

This product can be reconstituted with 2 volumes of water to produce a fluid whole milk whose flavor is substantially the same as the pasteurized homogenized original whole milk. The liquid concentrated product can be stored at 40° F. or below for at least three weeks without development of an off flavor.

EXAMPLE 3

The butter fat and solids-not-fat content of whole milk is adjusted by addition or removal of cream or skim milk so that the ratio of butter fat to solids-not-fat in the milk is 1.0:2.77. The resulting product is heated at 145° F. for 10 minutes and then drawn into a vacuum pan equipped with heating elements within the vacuum chamber. The milk is then concentrated at 110° F. under a pressure of 1.25 p. s. i. absolute within 6 hours to a solids content of 62.5%, after which it is removed from the vacuum chamber and cooled to room temperature.

Raw whole milk is incorporated in the concentrated milk to bring its solids content to 37%, after which it is heated to 140° F., homogenized at 3000 p. s. i., pasteurized at 155° F. for 30 minutes and cooled to 40° F.

The concentrated product has outstanding keeping qualities. It can be reconstituted with 2 volumes of water to produce a fluid milk substantially indistinguishable in flavor from an unconcentrated pasteurized homogenized fluid milk. It can also be reconstituted with 1 volume of water to produce a viscous extra-rich milk product having a butter fat content of about 5 to 5.5%, for use in coffee, on fruits, cereals and desserts.

EXAMPLE 4

Whole raw milk is heated to a temperature above 160° but not exceeding 162.5° F. for 5 seconds in order to reduce lipolytic activity and then drawn into the first effect of a double effect evaporator operating at an absolute pressure of not over 3.3 p. s. i., where it is heated to 145° F. and a proportion of the water content thereof removed, and then into the second effect of the evaporator operated at an absolute pressure not over 1.7 p. s. i. and a temperature of 120° F. The milk in the evaporator is maintained in motion at sufficient velocity to ensure a rapid transfer of heat from the heating surfaces within the evaporator to the milk. After the milk concentration has reached 40% solids, within about 1½ hours, the milk is withdrawn from the evaporator, brought to a solids content of 34.15% by addition of water, homogenized at a temperature of 120° F. and 2500 p. s. i., pasteurized at 175° F. for 16 seconds and cooled to 27° F.

The product can be reconstituted with 2 volumes of water to produce a fluid milk possessing substantially the same flavor as pasteurized homogenized whole milk and useful for drinking, cooking and any of the other uses of ordinary fluid milk.

EXAMPLE 5

Whole raw milk of normal quality is separated into skim milk and cream. The cream and skim milk are heated separately at from 140 to 145° F. for 2½ minutes. The skim milk thereafter is condensed as set forth in Example 2, mixed with sufficient cream to bring the solids content to 38% and the butter fat to 10%, homogenized at 140° F. and 1500 p. s. i., pasteurized at 155° F. for 30 minutes and cooled.

The product can be reconstituted with 1 part of water to produce a product having a butter fat content of about 5.2%. It may also be reconstituted with 2 volumes of water to produce a milk slightly richer in flavor and body than the whole milk from which it was prepared.

The concentrated product may be stored at 30° F. for 4 weeks or more without developing an "off" flavor.

EXAMPLE 6

Whole raw milk is heated at 155° F. for one minute in order to reduce lipolytic activity and then condensed as set forth in Example 3 to a total solids content of 60%. The concentrated milk is then heated at 121° F. for 15 minutes after which there is a noticeable increase in its viscosity. The concentrated milk is then cooled to 40° F.; it may be held at this temperature for several days without spoilage due to bacterial growth. At any time before bacterial growth has increased to an undesirable degree, the concentrated milk can be mixed with water, cream, fresh whole milk, fresh skim milk, or mixtures of the above to reduce its solids content to 40% or less, heated to a homogenizing temperature, homogenized, pasteurized and cooled to 40° F. as set forth in any of the preceding examples.

EXAMPLE 7

Whole raw milk is separated into skim milk and cream. The skim milk is heated at a temperature of 155° to 160° F. for 12 seconds and then drawn into the first effect of a double effect evaporator operating at an absolute pressure of not over 3.3 p. s. i. where a portion of the water content thereof is removed by heating at about 145° F. for 10 minutes. The milk is then drawn into the second effect of the evaporator operating at an absolute pressure of not over 2 p. s. i. and a temperature of about 125° F. where it is condensed to a total solids content of from 45 to 50%. The total time of concentration should not exceed 4 hours. The concentrated milk is then removed from the second effect of the evaporator and heated at 145° F. for a few minutes until there is a noticeable increase in its viscosity, and then cooled. The resulting concentrated skim milk may be held in cold storage at 27° F. just above its freezing point for three weeks or more without undesirable bacterial decomposition.

Whenever desired for use, the concentrated skim milk may be mixed with cream, which has previously been heated to 150° F., and water or fresh milk, to adjust the ratio of butter fat and solids-not-fat to 1:2.85, and the mixture heated, homogenized, pasteurized and cooled. The product reconstitutes with water to give a milk containing 3.5% butter fat and 10% milk solids-not-fat.

Instead of heating the cream to a temperature at which lipase activity is reduced, before mixing with the concentrated skim milk, the cream, water, and/or milk may be heated to at least 140° F. for a time sufficient to reduce lipolytic activity in the cream (and in the whole milk if whole milk is used) before the mixture is homogenized.

EXAMPLE 8

Whole milk is separated into skim milk and cream. The cream is heated to at least 155° but not over 160° F. and homogenized at a pressure of 3000 to 5000 p. s. i., sufficient to cause a clumping of the butter fat globules in the cream as evidenced by an appreciable increase in viscosity.

The skim milk is preheated and concentrated by the method set forth in Example 2.

The homogenized cream is combined with the concentrated skim milk and the mixture pasteurized at 155° F. for 30 minutes and cooled to 40° F. or lower without further homogenization.

This concentrated milk, upon reconstitution with water to its original solids content, will taste richer than pasteurized homogenized milk made from the same raw milk supply. It may also be reconstituted with a small volume of water to produce an extra-rich milk with a creamier flavor than ordinary pasteurized homogenized milk.

Milk reconstituted from concentrated milk made by pasteurizing a mixture of homogenized cream and concentrated skim milk according to the process described in Example 8 is distinguishable from pasteurized homogenized whole milk and from concentrated milk prepared by concentrating whole milk without clumping the fat globules in the cream. Table VII shows the results of difference-preference tests conducted in the following manner: Tasters were given a sample of milk reconstituted from concentrated milk made according to Example 8, and a sample of the milk with which it was being compared. Each taster was asked to indicate his preference between the two, after which he tasted a third sample which was identical with one of the first two and asked which of the first two samples it matched.

tinguishable in flavor from whole raw milk which has been heated to 138° F. and homogenized.

EXAMPLE 10

Whole milk is separated into skim milk and cream having 18% butter fat. The cream is preheated and concentrated as set forth in Example 1 to a butter fat content of 40% and then is heated to at least 155° F. but not over 165° F. and homogenized at a pressure of 3,000 to 5,000 p. s. i. sufficient to cause a clumping of the butter fat globules in the cream as evidenced by an appreciable increase in viscosity.

The skim milk is concentrated separately as set forth in Example 2.

The homogenized concentrated cream and concentrated skim milk are mixed, pasteurized at 155° F. for 30 minutes, and cooled to 40° F. without further homogenization.

This concentrated milk upon reconstruction with water to its original solids content will taste richer than pasteurized homogenized milk made from the same raw milk product. It may also be reconstituted with a small volume of water to produce an extra-rich milk product of excellent flavor.

By the process of this invention, concentrated milks may be produced with various butter fat and total solids content so that, on reconstitution with from two to five volumes of water, the resulting product will meet the butter fat and solids-not-fat requirements for fluid milk in any area.

TABLE VII

| Number of tasters | Correctly matched like samples | Matched unlike samples | Unable to match samples | Calculated deviation from equality, in standard errors | Probability of chance selection, less than— | Preferred sample A | Preferred sample B | No choice | Preferred sample | Degree of preference deviation from equality, in standard errors | Probability of chance occurrence of preference |
|---|---|---|---|---|---|---|---|---|---|---|---|
| | | | | | Percent | | | | | | Percent |
| 1. 100 | 71 | 29 | 0 | 4.2 | 0.005 | 56 | 39 | 5 | A | 1.7 | 8.91 |
| 2. 77 | 45 | 32 | 0 | 1.5 | 13.36 | 43 | 31 | 3 | A | 1.4 | 16.15 |
| 3. 80 | 45 | 35 | 0 | 1.1 | 27.13 | 45 | 29 | 6 | A | 1.8 | 7.19 |
| 4. 77 | 44 | 33 | 0 | 1.3 | 19.36 | 44 | 32 | 4 | A | 1.4 | 16.15 |

Sample A in every case was reconstituted from concentrated milk made by mixing homogenized cream with concentrated skim milk as set forth in Example 8. Sample B, with which Sample A was compared, was as follows in each comparison test:
1. Fresh homo. past. whole milk.
2. Reconstituted conc. whole milk.
3. Reconstituted conc. whole milk.
4. Reconstituted conc. milk made from conc. skim milk rehomogenized with homogenized cream.

The results of these tests show that milk reconstituted from concentrated milk made with cream in which the fat globules have been clumped is distinguishable from and preferred slightly over the milks with which it was compared.

EXAMPLE 9

Whole raw milk is concentrated to a total solids content between 34% and 35% in an evaporator which previously has been thoroughly cleaned and preferably treated with a sanitizing agent to reduce the probability of bacterial infection. The concentration is accomplished at a temperature of 134 to 138° F. and at absolute pressures between 2.5 and 2.75 p. s. i. The concentrated milk is then removed from the evaporator, homogenized and cooled to a temperature preferably between 27° F. and 35° F. The homogenizer, cooler, and all lines, vessels and equipment with which the concentrated milk comes into contact should be thoroughly cleaned and preferably sanitized before use.

This concentrate can be reconstituted with two volumes of water to produce a fluid milk indis- When reconstituted with less than the amount of water prescribed a partly concentrated milk is obtained particularly suitable for use on cereals and fruit.

The concentrated milk may be used full strength for creaming coffee and tea.

Carbonated water in any flavor may be mixed with the concentrated milk to produce a variety of beverages.

More milk solids may be incorporated into cream soups and sauces, casseroles and puddings when concentrated milk is used. The concentrated milk may also be used to prepare homemade frozen desserts.

To a dairy processer the concentrated milk furnishes a substantial saving in time required to homogenize, pasteurize, fill and stack milk containers, as well as a substantial reduction in containers, refrigerated storage space and delivery bulk. Because of the increased keeping properties of the concentrated product, there also exists the possibility of decreased returns due to spoilage, and the need for less frequent deliveries.

To the home consumer the concentrated milk offers equivalent advantages. For example, when the milk is reduced to one-third its volume only one quart need be carried instead of three, and a corresponding saving in space in the refrigerator is had. In addition, there are the variety of novel uses in new recipes, etc. which natural fluid milk does not possess. The product is especially welcome to those individuals whose diets require large quantities of the proteins of the high biological value of those found in milk.

The concentrated product having a solids content of from 20 to 50% by weight is particularly useful in the production of milk products having a reduced lactose content. To such a concentrate a lactase enzyme preparation can be added, after which it is held at a temperature from 25 to 135° F. for from 4 hours to about 10 days. From 1.5% to 3% of enzyme by weight of the lactose present is a desirable amount to employ, and amounts within this range under the temperature conditions set forth will effect over 85% hydrolysis of the lactose in the milk concentrate. The hydrolysis can be halted at any time by treating the milk to inactivate the lactase enzyme as, for example, by pasteurization. In the hydrolysis, lactose is converted by glucose and galactose so that the lactose content is reduced without changing the sugar content of the milk. The resulting concentrate therefore can be concentrated to very high solids content without precipitation of lactose, and is useful in the preparation of animal foods, ice cream concentrates and the like, where a high lactose content is undesirable, for various reasons.

All parts and percentages in the specification and claims are by weight unless otherwise indicated.

We claim:

1. In the process of preparing a concentrated milk which includes the steps of preheating the milk at a temperature at which lipase activity is reduced, concentrating the milk under reduced pressure and pasteurizing the milk, the improvement which comprises maintaining the temperature and duration of the treatment in the preheating step within the shaded area of Fig. 1, in the concentrating step as defined by curve C and within the area below curve C of Fig. 2 and in the pasteurizing step within the shaded area of Fig. 3, whereby damage of flavor-imparting milk constituents with attendant development of "cooked" flavor are avoided and a concentrated milk is produced which can be reconstituted with water to produce a milk substantially indistinguishable in flavor from the original unconcentrated milk after pasteurization.

2. A process of preparing a concentrated lacteal fluid which comprises preheating the lacteal fluid at a temperature within the range from about 162.5° to about 120° F. for from about 6 seconds to about 1500 seconds as defined by the shaded area of Fig. 1 in order to reduce lipase activity, concentrating the lacteal fluid at a temperature not above about 150° F. for from about 900 seconds to about 6 hours as defined by curve C and the area below curve C of Fig. 2 and pasteurizing the concentrate at a temperature within the range from about 176.5° to about 150° F. for from about 3 seconds to about 1800 seconds as defined by the shaded area of Fig. 3, whereby damage of flavor-imparting lacteal fluid constituents with attendant development of "cooked" flavor are avoided and a concentrated lacteal fluid is produced which can be reconstituted with water to produce a lacteal fluid substantially indistinguishable in flavor from the original unconcentrated lacteal fluid after pasteurization.

3. A lacteal fluid concentrate produced by the process of claim 2 which is reconstitutable with water to produce a lacteal fluid substantially indistinguishable in flavor from the lacteal fluid from which it was originally prepared, the comparison being made after pasteurization.

4. A process in accordance with claim 2 which includes preheating the lacteal fluid at a temperature and for a time defined by curve A of Fig. 1, in order to reduce the bacterial count in addition to reducing lipase activity.

5. A process in accordance with claim 2 which includes homogenizing the concentrate at a temperature above about 120° F. and a pressure within the range from 1500 to 5000 p. s. i.

6. A process in accordance with claim 2 in which cream is concentrated.

7. A process in accordance with claim 2 in which raw whole milk is concentrated.

8. A process in accordance with claim 2 in which skim milk is concentrated.

9. A process in accordance with claim 2 which includes concentrating the lacteal fluid at least to one-third its volume.

10. A process in accordance with claim 2 which includes concentrating the lacteal fluid to a solids content of at least 60%.

11. A process of preparing a concentrated milk which comprises preheating the milk at a temperature within the range from about 162.5 to about 120° F. for from about 6 seconds to about 1500 seconds in order to reduce lipase activity, concentrating the milk at a temperature not above about 110° F. for a period not exceeding about 6 hours, and pasteurizing the concentrate at a temperature within the range from about 155 to about 150° F. for from about 120 seconds to about 1800 seconds, whereby damage of flavor-imparting milk constituents with attendant development of "cooked" flavor are avoided and a concentrated milk is produced which can be reconstituted with water to produce a milk substantially indistinguishable in flavor from the original unconcentrated milk after pasteurization.

12. A fluid milk concentrate produced by the process of claim 11 which is reconstitutable with water to produce a milk substantially indistinguishable in flavor from the milk from which it was originally prepared, the comparison being made after pasteurization, said concentrate having a solids content of at least 60%.

13. A process of preparing a pasteurized concentrated milk which, when reconstituted with water, has an improved flavor compared to the fluid milk, after pasteurization, from which it was prepared, comprising separating whole milk into skim milk and cream, preheating the skim milk at a temperature within the range from about 162.5° to about 120° F. for from about 6 seconds to about 1500 seconds as defined by the shaded area of Fig. 1 to reduce lipase activity, concentrating the milk at a temperature not above about 150° F. for from about 900 seconds to about 6 hours as defined by curve C and the area below curve C of Fig. 2, homogenizing the cream at a temperature within the range from about 120° to about 160° F. at a pressure within the range from 3000 to 5000 p. s. i. combining the homogenized cream with the skim milk concentrate and then pasteurizing the mixture at a temperature within the range from about 176.5° to about 150° F. for from about 3 seconds to about 1800 seconds as defined by the shaded area of Fig. 3.

14. A process of preparing a pasteurized concentrated milk which can be reconstituted with water, comprising separating whole milk into skim milk and cream, preheating the skim milk at a temperature within the range from about 162.5° to about 120° F. for from about 6 seconds to about 1800 seconds as defined by the shaded area of Fig. 1, concentrating the skim milk at a temperature not above about 150° F. for from about 900 seconds to about 6 hours as defined by curve C and the area below curve C of Fig. 2, homogenizing the cream at a temperature within the range from about 120° to about 165° F. and a pressure within the range of 3000 to 5000 p. s. i., combining the homogenized cream with the skim milk concentrate, homogenizing the combined mixture at a temperature within the range of 120° to 140° F. and a pressure within the range of 1500 to 2500 p. s. i., and pasteurizing the homogenized mixture at a temperature within the range from about 176.5° to about 150° F. for from about 3 seconds to about 1800 seconds as defined by the shaded area of Fig. 3.

15. A process of preparing a pasteurized concentrated milk which, when reconstituted with water, has a flavor fully as acceptable as the fluid milk after pasteurization from which it was prepared, comprising separating whole milk into skim milk and cream, preheating the skim milk at a temperature within the range from about 162.5° to about 120° F. for from about 6 seconds to about 1800 seconds as defined by the shaded area of Fig. 1, concentrating the skim milk at a temperature not above about 150° F. for from about 900 seconds to about 6 hours as defined by curve C and the area below curve C of Fig. 2, homogenizing the cream at a temperature within the range from about 120° to about 165° F. and a pressure within the range of 1000 to 5000 p. s. i., combining the homogenized cream with the skim milk concentrate, homogenizing the combined mixture at a temperature within the range of 140° to 150° F. and a pressure within the range of 1500 to 2500 p. s. i. and pasteurizing the homogenized mixture at a temperature within the range from about 176.5° to about 150° F. for from about 3 seconds to about 1800 seconds as defined by the shaded area of Fig. 3.

16. A process of preparing a concentrated milk which, when reconstituted with water, will be fully comparable in flavor acceptability to the milk product obtained by homogenizing and pasteurizing the fluid milk from which the concentrate was prepared, comprising preheating the milk at a temperature within the range from about 162.5° F. to about 120° F., for from about 6 seconds to about 1500 seconds, as defined by the shaded area of Fig. 1, to reduce lipase activity, concentrating the milk at a temperature not above 110° F. within a period of not over 6 hours as to a solid content of from 55 to 63%, diluting the concentrate with an aqueous liquid to a solids content between 25 and 40% to permit pasteurization without substantially increasing the viscosity of the product, homogenizing the concentrate at a temperature above about 120° F. and a pressure within the range from about 3000 to about 5000 p. s. i., and pasteurizing the concentrate at a temperature within the range from about 176.5° to about 150° F. for from 3 seconds to about 1800 seconds as defined by the shaded area of Fig. 3.

17. A process in accordance with claim 16 in which the aqueous liquid is water.

18. A process in accordance with claim 16 in which the aqueous liquid is milk.

19. A process in accordance with claim 16 in which the aqueous liquid is cream.

20. A process in accordance with claim 16 in which the aqueous liquid is skim milk.

21. A process of preparing a concentrated milk which includes the steps of preheating the milk at a temperature within the range from about 162.5° to about 120° F. for from about 6 seconds to about 1500 seconds, as defined by the shaded area of Fig. 1, to reduce lipase activity, and concentrating the milk at a temperature not above about 150° F. for from about 900 seconds to about 6 hours, as defined by curve C and the area below curve C of Fig. 2, whereby damage of flavor-imparting milk constituents with attendant development of "cooked" flavor is avoided and a concentrated milk is produced which has improved keeping qualities compared to the original unconcentrated milk.

22. A process of preparing a concentrated milk which includes the steps of preheating the milk at a temperature within the range from about 162.5 to about 120° F. for from about 6 seconds to about 1500 seconds as defined by the shaded area of Fig. 1 to reduce lipase activity and concentrating the milk at a temperature not above about 110° F. within a period of not above about 6 hours to a solids content within the range from 55 to 63%, whereby damage of flavor-imparting milk constituents with attendant development of "cooked" flavor are avoided and a concentrated milk is produced which has improved keeping qualities compared to the original unconcentrated milk.

RANDALL WHITAKER.
ALEXANDER C. HERRO.

References Cited in the file of this patent

UNITED STATES PATENTS

| Number | Name | Date |
| --- | --- | --- |
| 2,198,217 | Musher | Apr. 23, 1940 |
| 2,392,401 | North et al. | Jan. 8, 1946 |

OTHER REFERENCES

Journal of Dairy Science, April 1942, page 307.